United States Patent [19]

Isobe et al.

[11] Patent Number: 5,186,739
[45] Date of Patent: * Feb. 16, 1993

[54] CERMET ALLOY CONTAINING NITROGEN

[75] Inventors: Kazutaka Isobe; Toshio Nomura, both of Hyogo, Japan

[73] Assignee: Sumitomo Electric Industries, Ltd., Osaka, Japan

[*] Notice: The portion of the term of this patent subsequent to Nov. 20, 2007 has been disclaimed.

[21] Appl. No.: 601,718

[22] PCT Filed: Feb. 21, 1990

[86] PCT No.: PCT/JP90/00200
§ 371 Date: Oct. 19, 1990
§ 102(e) Date: Oct. 19, 1990

[87] PCT Pub. No.: WO90/10090
PCT Pub. Date: Sep. 7, 1990

[30] Foreign Application Priority Data

Feb. 22, 1989 [JP] Japan .................................. 1-42766
Feb. 22, 1989 [JP] Japan .................................. 1-42767
Feb. 23, 1989 [JP] Japan .................................. 1-44716

[51] Int. Cl.$^5$ .......................... B22F 5/00; B22F 7/06; B23B 27/14
[52] U.S. Cl. ........................................ 75/238; 75/240; 428/560; 428/551; 428/553; 408/144; 76/108.6; 76/DIG. 11; 407/119
[58] Field of Search .................... 408/144; 407/119; 76/108.1, 108.6, DIG. 11; 419/13, 74, 15, 18; 428/560, 551, 553; 75/238, 240

[56] References Cited

FOREIGN PATENT DOCUMENTS 60-208447 10/1985 Japan .
61-12846 1/1986 Japan .
63-109139 5/1988 Japan .
63-297537 12/1988 Japan .

Primary Examiner—Donald P. Walsh
Assistant Examiner—Daniel Jenkins
Attorney, Agent, or Firm—W. G. Fasse; D. H. Kane, Jr.

[57] ABSTRACT

A cermet alloy and a drill formed of the cermet alloy include hard dispersed phases and binder metal phases. The hard dispersed phases include a metal atom group containing titanium and a nonmetal atom group containing nitrogen. The amount of titanium contained in the metal atom group is at least 0.5 and not more than 0.95 as an atomic ratio. The amount of nitrogen contained in the nonmetal atom group is at least 0.1 and not more than 0.7 as an atomic ratio. The hard dispersed phases further include a fine grained portion having a mean grain size of at least 0.2 μm and not more than 0.6 μm and a coarse grained portion having a mean grain size of at least 1 μm and not more than 3 μm. The volume ratio of the fine grained portion to the course grained portion is at least 0.3 and not more than 3. The proportion of the binder metal phases contained in the cermet is at least 5 percent by weight and not more than 30 percent by weight. This cermet drill has an excellent wear resistance, toughness and thermal cracking resistance.

4 Claims, 1 Drawing Sheet

GRAIN SIZE OF HARD DISPERSED PHASE

CERMET ALLOY CONTAINING NITROGEN

FIELD OF THE INVENTION

The present invention relates to a high-quality cermet alloy containing nitrogen which has an excellent wear resistance and toughness and is capable of withstanding high-speed cutting. The invention also relates to a drill which is formed of such a cermet alloy. The term "drill" as used herein refers to a drill bit.

Background Information

A drill is a cutting tool which is employed for drilling holes into a workpiece of steel or the like. FIG. 1 shows the structure of a twist drill by way of example. The twist drill generally comprises a head portion 1 which is adapted to cutting, and a shank portion 2 which is not much concerned with the cutting but is mainly adapted to discharge chips as well as to mount the drill in a chuck of a cutting machine such as a drilling machine.

In a working condition, the head portion and the shank portion of a drill are subject to different conditions. Therefore, characteristics required for the respective portions of the drill are different from each other. For example, wear resistance and deposition resistance etc. are required for a cutting edge part of the head portion, while toughness for maintaining strength of the tool is required for the shank portion. Also, different portions of the cutting edge part of the head portion must have different characteristics because the central cutting edge portion and the outer peripheral cutting edge portion are subject to vary different in cutting speeds. In order to satisfy such complicated requirements, various materials have hitherto been developed for drills.

Up to this time, general materials for drills are high-speed steel and cemented carbide. High-speed steel, which is superior in toughness but inferior in wear resistance, is improper for high-speed cutting. On the other hand, cemented carbide, which has an excellent wear resistance and cutting accuracy but is brittle, may be bent when used in a machine tool having low rigidity, for example.

In order to improve the above situation, a drill structure with a head portion of high-speed steel coated with hard TiN, or a structure with a head portion made of cemented carbide and brazing the same has been considered. However, the head portion subjected to coating has had such a disadvantage that a coating layer of at least its front flank side is removed when regrinding of the drill and the greater part of the effect of coating is lost. Further, the structure formed by brazing the head portion with cemented carbide has had such a disadvantage that the same cannot be used for cutting a hard to cut material; nor for deep hole drilling since brazing itself is essentially inferior in thermal strength and mechanical strength.

In recent years there have been proposed a structure of brazing different materials (P30 and D30) of cemented carbide, see Japanese Utility Model Laying-Open No. 58-143115, and a structure of metallurgically integrating or joining the same, see Japanese Utility Model Publication No. 62-46489 for attaining improvements in wear resistance and toughness. The difference between characteristics required for a central part and an outer peripheral part of a drill and making materials of cemented carbide for the central part and for the outer peripheral part to differ from each other to form a double structure, have been described in Japanese Patent Laying-Open No. 62-218010. Methods of forming this double structure by injection molding have been described in Japanese Patent Laying-Open Nos. 63-38501 and 38502. In addition, preparing the material for a drill from cermet, in order to improve the deposition resistance of the drill is described in Japanese Patent Laying-Open No. 62-292307 or the like. In these conventional examples, those preparing cemented carbide from coarse grains and bringing the same into strong binder phases for the purpose of improving the toughness of the shank portions of the drills, have unintendedly reduced strength of the materials or are subject to elastic change or distortion, which cause such a problem that the drills are bent during drilling by vibration of the workpieces, by instable rotation of the drilling machines or the like.

Thus, improvements have hitherto been made based on individual viewpoints, with respect to complicated requirements for drills. However, none of these conventional structures have completely satisfied the requirements for the overall characteristics of the drills.

SUMMARY OF THE INVENTION

It is an object of the present invention to provide a cermet alloy containing nitrogen, which has an excellent performance characteristic particularly in its wear resistance and toughness.

Another object of the present invention is to provide a cermet drill formed of cermet, which has excellent wear resistance and deposition resistance in a head portion of the drill, while having the necessary and sufficient characteristics in its shank portion.

Still another object of the present invention is to provide a drill of a sintered hard alloy formed of WC cemented carbide, which has an excellent wear resistance and deposition resistance in a head portion of the drill while having the necessary and sufficient characteristics in its shank portion.

The invention's purpose is to improve the wear resistance and deposition resistance in particular, among the characteristics required for a drill. It has been found to be necessary to employ cermet containing nitrogen, which is mainly composed of titanium (Ti), in order to improve the wear resistance and the deposition resistance. To this end, parametric experiments have been made with respect to various components contained in cermet. A number of effective features have been found.

A first drill embodiment has the following features:

(1) Hard dispersed phases of cermet have mixed structures of finely classified fine-grain hard phases with a grain size of 0.2 to 0.6 $\mu$m and coarse-grain hard phases with a grain size of 1 to 3 $\mu$m. The volume mixing ratio of the fine-grain hard phases to the coarse-grain hard phases is 0.3 to 3.0. Within this range, it is possible to effectively suppress the generation and progress of cracking caused by a thermal shock which is applied to the cutting edge of the drill when the drill is used. More preferably, the grain sizes of the fine-grain hard phases are 0.3 to 0.5 $\mu$m and the grain sizes of the coarse-grain hard phases are 1.5 to 2.2 $\mu$m.

(2) The hard dispersed phases of the cermet are composed of a nitride of titanium carbonitride compound of titanium and at least one metal selected from the groups IVa, Va and VIa of the periodic table excluding titanium, and the composition of the hard dispersed phases is such that the titanium content in metal atoms is 0.5 to 0.95 as an atomic ratio. Wear resistance and deposition resistance of cermet are rendered insufficient if the titanium content is less than 0.5. If the titanium content exceeds 0.95, on the other hand, the degree of sintering of cermet is deteriorated.

(3) The proportion of nitrogen in nonmetal atoms contained in the hard dispersed phases is 0.1 to 0.7 as an atomic ratio. Namely, an effect whereby nitrogen suppresses the grain growth of the hard dispersed phases during sintering, is not attained if the proportion of nitrogen is less than 0.1 as an atomic ratio. If the nitrogen ratio exceeds 0.7, on the other hand, the degree of sintering the cermet deteriorates.

(4) The amount of binder metal phases contained in the cermet is 5 percent by weight to 30 percent by weight. If it is less than 5 percent by weight, the toughness of cermet is rendered so insufficient that chipping is caused when the drill is used. If the binder exceeds 30 percent by weight, on the other hand, the wear resistance is rendered so insufficient that significant wear is caused in a flank of the cutting edge or a margin part of the drill.

In a second embodiment of the invention the drill has the following features:

(1) In order to suppress the generation and progress of cracking which is caused by a thermal shock at the cutting edge of the drill, the volume mixing ratio of fine-grain hard phases with a grain size of 0.2 to 0.6 $\mu$m to coarse-grain hard phases with a grain size of 1 to 3 $\mu$m must be in a range of 0.3 to 3.0. More preferably, the grain sizes of the fine-grain hard phases are 0.3 to 0.5 $\mu$m, and the grain sizes of the coarse-grain hard phases are 1.5 to 2.2 $\mu$m.

(2) In order to increase the toughness and strength required for drill shank portion, the hard dispersed phases of cermet must be fine grained structures with a grain size of 0.2 to 0.6 $\mu$m. The aforementioned two cermet materials are similar in composition to each other, although the same are different in characteristic from each other. Thus, it is possible to continuously join and form these materials without employing a discontinuous and low-strength joining method such as brazing. An example of such a joining method is the press (dry bag) time junction, HIP time junction or the like.

According to the invention, a head portion and a shank portion of a drill, which are formed of a different compositions of cermet materials, are integrally joined with each other. The composition of each part of this drill and characteristics thereof will now be described.

I. HEAD PORTION

A. Components of Hard Dispersed Phases a. The hard dispersed phases are composed of a nitride compound of titanium or a carbo-nitride compound of titanium and at least one metal selected from the groups IVa, Va and VIa of the periodic table excluding titanium, and the titanium content as metal atoms contained in the hard dispersed phases is in the range of 0.5 to 0.95 an atomic ratio. The wear resistance and the deposition resistance of cermet are rendered insufficient if the titanium content is less than 0.5. If the titanium content exceeds 0.95, on the other hand, the degree of sintering of the cermet deteriorates.

b. The proportion of nitrogen in nonmetal atoms contained in the hard dispersed phases is 0.1 to 0.7 as an atomic ratio. Namely, an effect whereby nitrogen atoms suppress the grain growth of the hard dispersed phases during sintering, is not attained if the nitrogen proportion is less than 0.1. If the nitrogen ratio exceeds 0.7, on the other hand, the degree of sintering of cermet deteriorates.

c. The hard dispersed phases are mixtures of fine-grained hard phases with a grain size of 0.2 to 0.6 $\mu$m and coarse grained hard phases with a grain size of 1.0 to 3.0 $\mu$m, wherein the volume ratio of the fine-grained hard phases to the coarse-grained hard phases is in the range of 0.3 to 3.0. If the ratio is less than 0.3, the toughness is rendered so inferior that chipping is caused in the cutting edge part of the drill. If the ratio exceeds 3.0, on the other hand, the thermal shock resistance is so deteriorated that thermal cracking occurs.

B. Amount of Binder Metal Phases Contained in the Cermet a. The amount of the binder metal phases contained in cermet is in a range of 5 percent by weight to 30 percent by weight. If the binder is less than 5 percent by weight, the toughness is rendered so insufficient that chipping is caused in the cutting edge. If the binder exceeds 30 percent by weight, on the other hand, the wear resistance is rendered so insufficient that significant wear is caused in the flank of the cutting edge or of a margin or edge portion of the drill.

II. Shank Portion

Since high toughness is required for the shank portion, the difference in the thermal expansion coefficient between the same and the cutting edge part must be not more than $1.0 \times 10^{-6}/°C$., in order to implement a low Young's modulus deformable in response to a bending load and to assure an excellent junction with the cutting edge part.

A. Components of the Hard Dispersed Phases a. The hard dispersed phases are composed of a nitride compound of titanium or a carbo-nitride compound of titanium and of at least one metal selected from the groups IVa, Va and VIa of the periodic table excluding titanium, and the titanium content in metal atoms contained in the hard dispersed phases is in the range of 0.5 to 0.95 as an atomic ratio. The junction strength with the cutting edge part is deteriorated if the titanium ratio is less than 0.5. The degree of sintering of the cermet deteriorates if the titanium content exceeds 0.95.

b. The proportion of nitrogen in nonmetal atoms contained in the hard dispersed phases is in the range of 0.1 to 0.7 as an atomic ratio. If the nitrogen proportion is less than 0.1, the grain growth of the hard dispersed phases is caused during sintering of the cermet, and no prescribed grain sizes can be obtained. The degree of sintering of the cermet deteriorates if the nitrogen content exceeds 0.7.

c. The grain sizes of the hard dispersed phases are in fine-grained structures with a grain size of 0.2 to 0.6 $\mu$m. If the grain sizes exceed 0.6 $\mu$m, the strength of cermet deteriorates and it is not possible to maintain a sufficient toughness which is required for the shank portion.

B. Amount of Binder Metal Phases Contained in the Cermet

The amount of the binder metal phases contained in the cermet is in a range of 5 percent by weight to 30 percent by weight. The strength is rendered insufficient if the binder metal is less than 5 percent by weight, while the cermet causes a plastic deformation if the binder metal exceeds 30 percent by weight. If the binder metal is out of the aforementioned range the difference between the thermal expansion coefficient of the shank and the cutting edge part increases undesirably.

Thus, according to the second embodiment of the invention, a head portion and a shank portion which are different in grain size and composition from each other, are integrally joined or molded together.

It has been further found, with regard to a third embodiment of the invention that WC-based cemented carbide is preferable used to make the drill shank in order to satisfy toughness and strength required for the shank portion of a drill. Thus, in a third embodiment, a cermet which is excellent in wear resistance and deposition resistance, is employed for the head portion of the drill, while WC-based cemented carbide which is excellent in toughness, is employed for the shank portion. The head portion and the shank portion are integrally joined with each other. The characteristics of this drill will now be described.

I. HEAD SECTION

A. Components of Hard Dispersed Phases of the Cermet a. The hard dispersed phases are composed of a a nitride compound of titanium or a carbo-nitride compound of titanium (Ti) and at least metal member selected from the groups IVa, Va and VIa of the periodic table excluding titanium, and the titanium content in metal atoms contained in the hard dispersed phases is in a range of 0.5 to 0.95 as an atomic ratio. The wear resistance and deposition resistance of the cermet are rendered insufficient if the titanium content is less than 0.5. If the titanium content exceeds 0.95, on the other hand, the degree of sintering of the cermet deteriorates.

b. The proportion of nitrogen as nonmetal atoms contained in the hard dispersed phases, is in a range of 0.1 to 0.7 as an atomic ratio. If the nitrogen is less than 0.1, an effect whereby nitrogen suppresses the grain growth of the hard dispersed phases during sintering of the cermet, cannot be attained. If the nitrogen exceeds 0.7, on the other hand, the degree of the sintering of cermet deteriorates.

c. The hard dispersed phases are formed of mixtures of fine-grained hard phases having a grain size of 0.2 to 0.6 μm and coarse-grained hard phases having a grain size of 1 to 3 μm, and the volume ratio of the fine-grained hard phases to the coarse-grained hard phases is in a range of 0.3 to 3. The toughness of the cermet deteriorates so that chipping is caused in the cutting edge of the drill if said volume ratio is less than 0.3. If the volume ratio exceeds 3.0, on the other hand, thermal cracking occurs in the cutting edge of the drill which is a problem.

B. Amount of Binder Metal Phases Contained in the Cermet

The amount of the binder metal phases contained in the cermet is in a range of 5 percent by weight to 30 percent by weight. If the binder metal is less than 5 percent by weight, the toughness of the cermet is rendered so insufficient that chipping is caused in the cutting edge of the drill. If the binder metal exceeds 30 percent by weight, on the other hand, wear resistance is rendered so insufficient that a significant wear is caused in the flank of the cutting edge or a margin or edge part.

II. SHANK SECTION

A. WC-based cemented carbide containing cobalt used to make the shank section of the drill. If high-speed steel or the like is employed for the shank, for example, cracks are easily produced in the junction between the head section; and the shank section by a thermal expansion difference between the shank and the cermet forming the head section, since the thermal expansion coefficient of the high speed steel is large. Further, the Young's modulus of high-speed steel is about ½ that of a WC-based alloy whereby wear defects of the head portion are caused by an inferior vibration resistance during cutting.

BEST MODES OF CARRYING OUT THE INVENTION

EXAMPLE 1

Cermet alloys having various material compositions and grain size distributions were used to form drills of 10 mm in diameter by the respective materials, and working performances thereof were experimentally examined. Table 1 shows compositions etc. of the various alloys subjected to the experiment, and alloys Nos. A to C in the Table indicate samples of the invention, while D to H indicate comparative samples. Among the comparative samples, D and E are used for comparison of proportions of nitrogen atoms as nonmetal atoms contained in the hard dispersed phases. Further, the comparative sample F is used for comparison of the grain size ratios of the hard dispersed phases. In addition, the comparative samples G and H are used for comparison of proportions of amounts of binder phases. The comparative samples D to H and the samples A to C of the invention were studied and compared with each other.

TABLE 1

| Classification | Alloy No. | Hard Dispersed Phase | | | | | | Amount of Binder Metal Phase (wt. %) | | Grain Size Abundance Ratio of Hard Phase |
|---|---|---|---|---|---|---|---|---|---|---|
| | | Composition Ratio of Metal Atoms | | | | | Nonmetal Atomic Ratio | | | |
| | | Ti | Ta | W | Mo | Nb | N/C + N | Ni | Co | A/B (*1) |
| Inventive Sample | A | 75 | 6 | 12 | — | 7 | 0.38 | 9 | 10 | 2.4 |
| | B | 87 | 5 | 8 | — | — | 0.41 | 10 | 12 | 1.0 |
| | C | 80 | 4 | 5 | 5 | 6 | 0.46 | 8 | 10 | 0.8 |
| Comparative Sample | D | 80 | 5 | 7 | 2 | 6 | 0 | 8 | 12 | 0.2 |
| | E | 73 | 6 | 8 | 6 | 7 | 0.72 | 10 | 12 | 0.1 |
| | F | 82 | 2 | 13 | — | 3 | 0.43 | 9 | 11 | at least 20 |
| | G | 73 | 8 | 9 | — | 10 | 0.37 | 1.5 | 2.5 | 1.1 |

TABLE 1-continued

| Classification | Alloy No. | Hard Dispersed Phase | | | | | Nonmetal Atomic Ratio N/C + N | Amount of Binder Metal Phase (wt. %) | | Grain Size Abundance Ratio of Hard Phase A/B (*1) |
|---|---|---|---|---|---|---|---|---|---|---|
| | | Composition Ratio of Metal Atoms | | | | | | | | |
| | | Ti | Ta | W | Mo | Nb | | Ni | Co | |
| | H | 85 | 6 | 4 | — | 5 | 0.42 | 15 | 19 | 1.4 |

Figure 1:
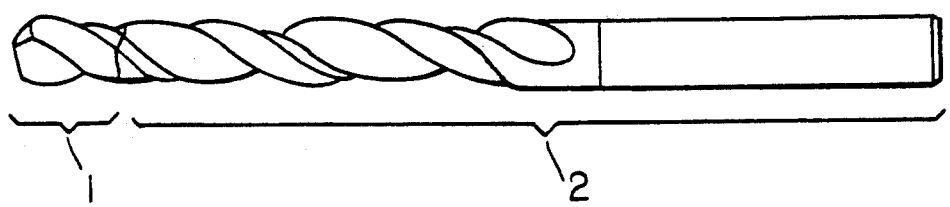
FIG. 1 is a diagram showing the structure of a twist drill.
Figure 2:
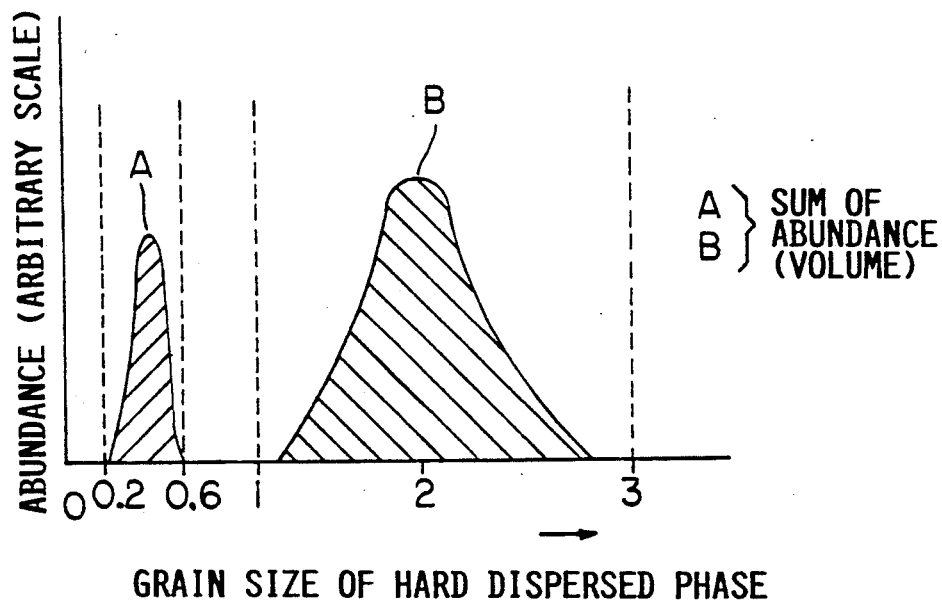
FIG. 2 is a distribution diagram showing the grain size distribution of the hard dispersed phases of the cermet.

(*1) Grain Size "Abundance" Ratio of Hard Phase: $\frac{A}{B}$ (Volume Ratio). (Refer to FIG. 2)

Table 2 shows conditions of drilling performance evaluation tests for the drills. The performance evaluation tests were performed under two types of conditions. The test 1 is a wear resistance evaluation test for the drills, wherein the drills perform continuous drilling work until the drills reach the ends of life due to breakage or wear, as determined by evaluating the status of the cutting edges thereof.

The test 2 is a thermal cracking resistance evaluation test for drills, wherein deep hole drilling is performed in the same portion of each workpiece a plurality of times for evaluating the cutting edge status after the completion of prescribed drillings.

TABLE 2

| No. | Test Name | Test Condition | |
|---|---|---|---|
| | | Item | Condition |
| ① | Wear Resistance Evaluation Test (Continuous Drilling) | Workpiece | S50C ($H_B$ = 230) |
| | | Cutting Speed | 60 m/min., wet type (water soluble cutting oil) |
| | | Feed Rate | 0.23 mm/rev |
| | | Depth | 25 mm |
| | | Criterion | status of cutting edge after working up to end of life |
| ② | Thermal Cracking Resistance Evaluation Test (Step Feed) | Workpiece | SCM425 ($H_B$ = 260) |
| | | Cutting Speed | 50 m/min., wet type (water soluble cutting oil) |
| | | Feed Rate | 0.25 mm/rev |
| | | Depth | drawn out every drilling by 5 mm and subjected to re-drilling. repeated 5 times, up to 25 mm |
| | | Criterion | status of cutting edge after working 500 holes |

In this experiment, a similar cutting test was also performed on a coated high-speed steel drill and a coated carbide drill, which are used nowadays, for reference.

Table 3 shows the results of the aforementioned drill performance evaluation tests. The following features are are shown by the results of the experiments listed shown in Table 3:

a. In comparing the samples A to C of the invention with the comparative samples D and E, it has been found that materials containing large amounts of coarse grains in the hard dispersed phases are inferior in shank strength and inferior in toughness due to sudden breakage etc., as shown by the results of the wear resistance test 1.

b. In comparing the samples A to C of the invention with the comparative sample F, it has been found that the drill is superior in shank strength but is significantly inferior in thermal cracking resistance (test 2) when the grain sizes of the hard dispersed phases are only fine grains within the above grain size range.

c. In comparing of the samples A to C of the invention with the comparative samples G and H, it has been found that the sample (comparative sample G) containing a small amount of binder phases is inferior in toughness (test 1), and the sample (comparative sample H) containing a large amount of binder phases is inferior in wear resistance (test 1 and test 2).

By comparing of these results of the experiments, it has been proven that the samples A to C of the invention excellent characteristics over the entire aspects of wear resistance, thermal cracking resistance, and shank toughness and strength. It has further been found from Table 3 that the samples also exhibit excellent characteristics as compared with the coated high-speed steel and the coated carbide material. The samples of the invention have such features that the present drills exhibit performances which are equivalent to those of new drills even if the present drills are further used after regrinding.

TABLE 3

| Classification | Alloy No. | Test ① | | Test ② |
|---|---|---|---|---|
| | | Number of Drilling | Status of Cutting Edge | Status of Cutting Edge |
| Inventive Sample | A | 2450 holes | normally worn | good |
| | B | 2390 holes | normally worn | good |
| | C | 2660 holes | normally worn | good |
| Comparative Sample | D | 384 holes | broken | two cracks with 500 holes |
| | E | 1248 holes | broken | caused chipping with 500 holes |
| | F | 2580 holes | margin part worn | got defective with 284 holes |
| | G | 104 holes | got defective | got defective with 32 holes |
| | H | 624 holes | front flank worn | front flank worn with 245 holes |
| Existing Sample | Coated with High-Speed Steel | 114 holes | front flank worn | worn with 24 holes |
| | Coated with Carbide (Single Material) | 2040 holes | rake face worn | rake face worn with 500 holes |
| | Coated with | 1820 holes | rake face worn | rake face worn with |

TABLE 3-continued

| Classification | Alloy No. | Test ① | | Test ② |
|---|---|---|---|---|
| | | Number of Drilling | Status of Cutting Edge | Status of Cutting Edge |
| | Carbide (Cutting Edge Alone) | | | 500 holes |

EXAMPLE 2

Table 4 shows compositions, grain size distributions etc. of cermet alloys used for an experiment. These cermet alloys were used to make drills having a diameter of 10 mm, with the respective single materials, and the drilling performances thereof were examined. As to the alloy groups shown in Table 4, the grain size distributions of the hard dispersed phases were noted in the group of alloys AA to FF, for example. Proportions of nitrogen as nonmetal atoms were mainly noted in the group of alloys GG to II. Further, the amounts of binder phases were mainly noted in the group of alloys JJ to MM.

TABLE 5

| No. | Test Name | Test Condition | |
|---|---|---|---|
| | | Item | Condition |
| ① | Wear Resistance Evaluation Test (Continuous Drilling) | Workpiece | S50C ($H_B = 230$) |
| | | Cutting Speed (water soluble cutting oil) | 60 m/min., wet type |
| | | Feed Rate | 0.23 mm/rev |
| | | Depth | 25 mm |
| | | Criterion | status of cutting edge after working up to end of life |
| ② | Thermal Cracking Resistance Evaluation Test | Workpiece | SCM425 ($H_B = 260$) |
| | | Cutting Speed | 50 m/min., wet type (water soluble cutting oil) |
| | (Step Feed) | Feed Rate | 0.25 mm/rev |
| | | Depth | drawn out every drilling by 5 mm and subjected to re-drilling. repeated 5 times, up to 25 mm |
| | | Criterion | status of cutting edge after working 500 holes |

TABLE 4

| Classification (*2) | Alloy No. | Hard Dispersed Phase | | | | | | Amount of Binder Metal Phase (wt. %) | | Grain-Size Abundance Ratio of Hard Phase A/B (*1) |
|---|---|---|---|---|---|---|---|---|---|---|
| | | Composition Ratio of Metal Atoms | | | | | Nonmetal Atomic Ratio N/C + N | | | |
| | | Ti | Ta | W | Mo | Nb | | Ni | Co | |
| Invention Sample 1 | AA | 85 | 7 | 8 | — | — | 0.42 | 10 | 10 | at least 20 |
| Comparative Sample | BB | 85 | 7 | 8 | — | — | 0.42 | 10 | 10 | 4.0 |
| Inventive Sample 2 | CC | 85 | 7 | 8 | — | — | 0.42 | 10 | 10 | 2.5 |
| Inventive Sample 2 | DD | 85 | 7 | 8 | — | — | 0.42 | 10 | 10 | 1.0 |
| Comparative Sample | EE | 85 | 7 | 8 | — | — | 0.42 | 10 | 10 | 0.2 |
| Comparative Sample | FF | 85 | 7 | 8 | — | — | 0.42 | 10 | 10 | at least 20 |
| Comparative Sample | GG | 80 | 10 | 7 | — | 3 | 0.08 | 8 | 7 | 1.5 |
| Inventive Sample 2 | HH | 80 | 6 | 5 | 2 | 7 | 0.36 | 9 | 5 | 1.5 |
| Comparative Sample | II | 83 | 4 | 5 | 2 | 6 | 0.75 | 10 | 6 | 1.5 |
| Comparative Sample | JJ | 73 | 8 | 9 | — | 10 | 0.38 | 3 | 1.5 | not more than 0.05 |
| Inventive Sample 1 | KK | 81 | 7 | 4 | — | 8 | 0.41 | 12 | 10 | not more than 0.05 |
| Inventive Sample 2 | LL | 85 | 6 | 4 | — | 5 | 0.42 | 12 | 8 | 0.7 |
| Comparative Sample | MM | 82 | 4 | 1 | 3 | 10 | 0.32 | 20 | 20 | not more than 0.05 |

(*1) Grain Size "Abundence" Ratio of Hard Phase: $\frac{A}{B}$ (Volume Ratio), (Refer to FIG. 2)

(*2) Invention Sample 1: for Shank
Invention Sample 2: for Cutting Edge

Performance evaluation tests were made under the conditions shown in Table 5, namely, a wear resistance evaluation test and a thermal cracking resistance evaluation test. Table 6 shows the results of the respective tests.

TABLE 6

| Classification | Alloy No. | Test ① | | Test ② |
|---|---|---|---|---|
| | | Number of Drilling | Status of Cutting Edge | Status of Cutting Edge |
| Invention Sample 1 | AA | 2550 holes | margin worn | chipped with 224 holes caused chipping with |

TABLE 6-continued

| Classification | Alloy No. | Test ① Number of Drilling | Test ① Status of Cutting Edge | Test ② Status of Cutting Edge |
| --- | --- | --- | --- | --- |
| Comparative Sample | BB | 2610 holes | margin worn | 500 holes |
| Invention Sample 2 | CC | 2430 holes | shank broken | good |
|  | DD | 2580 holes | shank broken | good |
| Comparative Sample | EE | 2110 holes | front flank worn | broken with 128 holes |
|  | FF | 505 holes | broken | good |
| Comparative Sample | GG | 1420 holes | broken | caused chipping with 280 holes |
| Invention Sample 2 | HH | 2500 holes | shank broken | good |
| Comparative Sample | II | 2780 holes | margin worn | margin chipped with 500 holes |
| Comparative Sample | JJ | 160 holes | chipped | chipped with 15 holes |
| Invention Sample 1 | KK | 2410 holes | margin worn | chipped with 328 holes |
| Invention Sample 2 | LL | 2640 holes | shank broken | good front flank worn with |
| Comparative Sample | MM | 480 holes | front flank worn | 240 holes |

In the results of the group of the alloys AA to FF, the alloys AA to DD having relatively fine grain sizes of hard dispersed phases, had an excellent wear resistance. The alloys EE and FF caused sudden breakage. The alloys AA and BB having fine grain sizes, exhibited an inferior thermal cracking resistance. The alloy AA had the most excellent shank strength. The samples showed a tendency of becoming worse as the grain sizes of the hard dispersed phases were roughened (group of alloys CC to FF).

Thus, it has been shown that the alloys CC and DD are excellent in wear resistance and thermal cracking resistance and the alloy AA is excellent in shank strength in the group of the alloys AA to FF.

It has been shown that the life of the alloy GG is short and the alloy II is inferior in shank strength in the alloys GG to II.

In the group of the alloys JJ to MM, the alloy KK exhibited a superior shank strength, and the alloy LL exhibited a superior thermal cracking resistance. From the results, the alloy KK has properties suitable for a shank portion, and the alloy LL has properties suitable for a cutting edge part.

From the results shown in Table 6, the alloys CC, DD, HH and LL were selected as alloys having properties suitable for a head portion of a drill, and the alloys AA and KK were selected as alloys having properties suitable for a shank portion of the drill. Several types of drills were made by integrally joining and molding these alloys respectively, and the resulting drills were subjected to performance evaluation tests. Table 7 shows combinations of the alloys employed for the cutting edge parts and for the shank portions of the drills and the results of the evaluation tests thereof. The performance evaluation tests were made in accordance with the conditions shown in Table 5. Methods of joining alloys with each other include thermal diffusion, or a method of joining and molding the respective samples in a powder compression molding process and thereafter integrating the same by sintering. The methods are used for forming and connecting the cutting edge parts and the shank portions of the drills. For the purpose of reference, Table 7 also shows test results of a currently used coated high-speed drill and coated carbide drills.

TABLE 7

| Composite Alloy No. | Combination Cutting Edge | Combination Shank | Test ① Number of Drilling | Test ① Status of Cutting Edge | Test ② Status of Cutting Edge |
| --- | --- | --- | --- | --- | --- |
| NN | CC | AA | 2790 holes | margin worn | good |
| OO | DD | AA | 2680 holes | front flank worn | good |
| PP | DD | KK | 2730 holes | front flank worn | good |
| QQ | HH | KK | 2840 holes | front flank worn | good |
| Coated with High-Speed Steel | | | 145 holes | front flank worn | worn with 20 holes |
| Coated with Carbide (Single Material) | | | 1980 holes | rake face worn chipped | rake face worn with 500 holes |
| Coated with Carbide (Cutting Edge Alone) | | | 1770 holes | rake face worn | rake face worn with 500 holes |

Comparing the results of the performance evaluation tests shown in Table 7 with Table 6, it is clear that every one of the present composite alloys NN to QQ has a good wear resistance, a good thermal cracking resistance and a high toughness. Further, the composite alloys NN to QQ caused absolutely no breakage which was suddenly caused in the alloys EE and FF, for example, in the performance evaluation tests shown in Table 6. In addition, it has been found that the present composite alloys have a high quality since no change was recognized in various properties thereof even if the head portions were reground.

EXAMPLE 3

A sintered hard alloy drill is formed by using a cermet alloy for a head portion, using WC cemented carbide for a shank portion, joining the same to each other by press forming of fine particles, and sintering the same. Table 8 shows compositions and grain size distributions of the cermet alloy portions of sintered hard alloy drills subjected to performance tests and drills used for comparison. Referring to Table 8, alloys DDD and EEE of comparative samples were used mainly noting proportions of nonmetal atoms contained in the hard dispersed phases. Further, an alloy FFF of the comparative sample was used noting the grain size distribution of the hard dispersed phases. In addition, alloys GGG and HHH of the comparative samples were used noting proportions of the binder metal phases contained in the cermet materials.

Table 10 shows the results of the aforementioned drill performance evaluation tests. Referring to Table 10, the alloys DDD and EEE were inferior particularly in the toughness of the cutting edge, and suddenly caused breakage during the test ① comparing of the alloys AAA to CCC with the alloys DDD and EEE.

In comparing of the alloys AAA to CCC with the alloy FFF, it has been shown that the alloy FFF was inferior in thermal cracking resistance.

In comparing of the alloys AAA to CCC with the alloys GGG and HHH, it has been shown that the alloy

TABLE 8

| Classification | Alloy No. | Hard Dispersed Phase | | | | | | Amount of Binder Phase (Wt. %) | | Grain Size Abundance Ratio of Hard Phase |
|---|---|---|---|---|---|---|---|---|---|---|
| | | Composition Ratio of Metal Atoms | | | | | Nonmetal Atomic Ratio | | | |
| | | Ti | Ta | W | Mo | Nb | N/C + N | Ni | Co. | A/B (*1) |
| Inventive Sample | AAA | 83 | 7 | 10 | — | — | 0.42 | 10 | 11 | 2.3 |
| | BBB | 72 | 4 | 10 | 4 | 10 | 0.37 | 9 | 10 | 1.0 |
| | CCC | 88 | 5 | 5 | — | 2 | 0.50 | 7 | 14 | 0.7 |
| Comparative Sample | DDD | 86 | 5 | 4 | — | 5 | 0 | 10 | 11 | 0.2 |
| | EEE | 80 | 6 | 5 | 2 | 7 | 0.75 | 8 | 12 | 0.1 |
| | FFF | 73 | 8 | 9 | — | 10 | 0.40 | 9 | 10 | at least 20 |
| | GGG | 82 | 10 | 3 | 1 | 4 | 0.46 | 2 | 2 | 1.2 |
| | HHH | 80 | 10 | 7 | 1 | 2 | 0.32 | 13 | 18 | 1.5 |

(*1) Grain Size Dependence Ratio of Hard Phase: $\frac{A}{B}$ (Volume Ratio), (Refer to FIG. 2)

Performance evaluation tests of the drills were made by producing drills having a diameter of 10 mm, of the materials of the alloys AAA to HHH shown in Table 8, under conditions shown in Table 9. The performance evaluation tests are mainly performed as a wear resistance evaluation test and as a thermal cracking resistance test.

TABLE 9

| No. | Test Name | Test Condition | |
|---|---|---|---|
| | | Item | Condition |
| ① | Wear Resistance Evaluation Test (Continuous Drilling) | Workpiece | S50C (H$_B$ = 230) |
| | | Cutting Speed | 55 m/min., wet type (water soluble cutting oil) |
| | | Feed Rate | 0.21 mm/rev |
| | | Depth | 25 mm |
| | | Criterion | status of cutting edge after working up to end of life |
| ② | Thermal Cracking Resistance Evaluation Test (Step Feed) | Workpiece | SCM435 (H$_B$ = 280) |
| | | Cutting Speed | 50 m/min., wet type (water soluble cutting oil) |
| | | Feed Rate | 0.23 mm/rev |
| | | Depth | drawn out every drilling by 5 mm and subjected to re-drilling. repeated 5 times, up to 25 mm |
| | | Criterion | status of cutting edge after working 500 holes |

GGG was inferior in thermal cracking resistance and its life was extremely short. It has also been shown that the alloy HHH was inferior in wear resistance.

For the purpose of comparison, the performance tests were also made on currently used coated high-speed steel or coated carbide drills. Comparing these drills with the drills of the alloys AAA to CCC, it is clear that the performances of the drills of the present invention samples are superior in any test.

The performance evaluation tests were also made on the alloys AAA to CCC representing samples of the invention, and on drill with a tip and shank made of a single material of the alloy AAA and a drill with a tip and shank made of a single material of WC cemented carbide, for example. As a result, a characteristic improvement is noted in the strength of the alloy AAA according to the present invention as in the sample of the invention compared to the alloy AAA as used in the single material sample. Comparing the alloy AAA in the sample of the invention with the WC cemented carbide, makes, it is clear that the alloy AAA according to the present invention is superior in both wear resistance and strength.

TABLE 10

| Classification | Alloy No. | Test ① | | Test ② |
|---|---|---|---|---|
| | | Number of Drilling | Status of Cutting Edge | Status of Cutting Edge |
| Invention Sample | AAA | 2630 holes | normally worn | good |
| | BBB | 2440 holes | normally worn | good |
| | CCC | 2540 holes | normally worn | good |
| Comparative Sample | DDD | 390 holes | broken | two cracks with 500 holes |
| | EEE | 1308 holes | broken | caused chipping with 500 holes |
| | FFF | 2480 holes | margin worn | chipped with 343 holes |
| | GGG | 212 holes | chipped | chipped with 82 holes |

TABLE 10-continued

| Classification | Alloy No. | Test ① Number of Drilling | Test ① Status of Cutting Edge | Test ② Status of Cutting Edge |
| --- | --- | --- | --- | --- |
| | HHH | 845 holes | front flank worn | worn with 245 holes |
| Reference | Coated with High-Speed Steel | 84 holes | front flank worn | worn with 18 holes |
| | Coated with Carbide (Single Material) | 2120 holes | rake face worn | rake face worn with 500 holes |
| | Coated with Carbide (Cutting Edge Alone) | 1940 holes | rake face worn | rake face worn with 500 holes |
| | Alloy AAA (Single Material) | 1420 holes | broken | good |
| | WC Cemented Carbide | 1430 holes | entirely significantly worn | cause chipping with 342 holes |

As hereinabove described, the cermet alloy containing nitrogen according to the present invention is advantageously applicable to making drills, and end mill, a cutting tool for milling or the like, for which excellent properties are required in wear resistance, toughness and high-speed cutting.

We claim:

1. A cermet alloy containing nitrogen, comprising hard dispersed phases mainly composed of one member selected from the group consisting of a nitride compound of titanium and a carbo-nitride compound of titanium, said cermet alloy further comprising at least one metal selected from the group consisting of groups IVa, Va and VIa of the periodic table excluding titanium, and binder metal phases selected from the group consisting of nickel and cobalt, wherein said hard dispersed phases include a metal atom group containing titanium and a nonmetal atom group containing nitrogen, the amount of said titanium contained in said metal atom group is at least 0.5 and not more than 0.95 as an atomic ratio, the amount of said nitrogen contained in said nonmetal atom group is at least 0.1 and not more than 0.7 as an atomic ratio, said hard dispersed phases comprise a fine grained portion having a mean grain size within the range of at least 0.2 μm and not more than 0.6 μm and a coarse grained portion having a mean grain size within the range of at least 1 μm and not more than 3 μm, the volume ratio of said fine grained portion to said coarse grained portion is at least 0.3 and not more than 3, and wherein the proportion of said binder metal phases contained in said cermet alloy containing nitrogen, is at least 5 percent by weight and not more than 30 percent by weight.

2. A drill formed of a cermet comprising hard dispersed phases mainly composed of one member selected from the group consisting of a nitride compound of titanium and a carbo-nitride compound of titanium, said cermet alloy further comprising at least one metal selected from the group consisting of groups IVa, Va and VIa of the periodic table excluding titanium, and binder metal phases selected from the group consisting of nickel and cobalt, wherein said hard dispersed phases include a metal atom group containing titanium and a nonmetal atom group containing nitrogen, the amount of said titanium contained in said metal atom group is at least 0.5 and not more than 0.95 as an atomic ratio, the amount of said nitrogen contained in said nonmetal atom group is at least 0.1 and not more than 0.7 as an atomic ratio, said hard dispersed phases comprise a fine grained portion having a mean grain size within the range of at least 0.2 μm and not more than 0.6 μm and a coarse grained portion having a mean grain size within the range of at least 1 μm and not more than 3 μm, the volume ratio of said fine grained portion to said coarse grained portion is at least 0.3 and not more than 3, and wherein the proportion of said binder metal phases contained in said cermet, is at least 5 percent by weight and not more than 30 percent by weight.

3. A drill formed of cermet, comprising a head section including cutting means for cutting a work piece and a shank section carrying said head section, said cermet comprising hard dispersed phases mainly composed of one member selected from the group consisting of a nitride compound of titanium and a carbo-nitride compound of titanium, said cermet alloy further comprising at least one metal selected from the group consisting of groups IVa, Va and VIa of the periodic table excluding titanium, and binder metal phases selected from the group consisting of nickel and cobalt, wherein said hard dispersed phases include a metal atom group containing titanium and a nonmetal atom group containing nitrogen, the amount of said titanium contained in said metal atom group is at least 0.5 and not more than 0.95 as an atomic ratio, the amount of said nitrogen contained in said nonmetal atom group is at least 0.1 and not more than 0.7 as an atomic ratio, the proportion of said binder metal phases contained in said cermet is at least 5 percent by weight and not more than 30 percent by weight, said hard dispersed phases of said cermet forming said head section comprise a fine grained portion with a mean grain size of at least 0.2 μm and not more than 0.6 μm and a coarse grained portion with a mean grain size of at least 1 μm and not more than 3 μm, the volume ratio of said fine grained portion to said coarse grained portion is at least 0.3 and not more than 3, and wherein said hard dispersed phases of said cermet forming said shank portion are formed substantially by grains having a grain size within the range of at least 0.2 μm and not more than 0.6 μm.

4. A sintered hard alloy drill comprising a head section for cutting a workpiece and a shank section carrying said head section, wherein said head section is formed of a cermet comprising hard dispersed phases mainly composed of one member selected from the group consisting of a nitride compound of titanium and a carbonitride compound of titanium, said cermet alloy further comprising at least one metal selected from the group consisting of groups IVa, Va and VIa of the periodic table excluding titanium, and binder metal phases selected from the group consisting of nickel and cobalt, wherein said hard dispersed phases include a metal atom group containing titanium and a nonmetal atom group containing nitrogen, the amount of said titanium contained in said metal atom group is at least 0.5 and not more than 0.95 as an atomic ratio, the amount of said nitrogen contained in said nonmetal atom group is at least 0.1 and not more than 0.7 as an atomic ratio, said hard dispersed phases comprise a fine grained portion with a mean grain size of at least 0.2 μm and not more than 0.6 μm and a coarse grained portion with a mean grain size of at least 1 μm and not more than 3 μm, the volume ratio of said fine grained portion to said coarse grained portion is at least 0.3 and not more than 3, the proportion of said binder metal phases contained in said cermet is at least 5 percent by weight and not more than 30 percent by weight, and wherein said shank portion is integrally joined with said head portion, and formed of WC cemented carbide containing cobalt.

* * * * *

UNITED STATES PATENT AND TRADEMARK OFFICE
CERTIFICATE OF CORRECTION

PATENT NO. : 5,186,739

DATED : February 16, 1993

INVENTOR(S) : Kazutaka Isobe, et al.

It is certified that error appears in the above-indentified patent and that said Letters Patent is hereby corrected as shown below:

Column 9, Table 4 should read as follows:

Table 4

| Classification (*2) | Alloy No. | Hard Dispersed Phase | | | | | | Amount of Binder Metal Phase (wt.%) | | Grain Size Abundance Ratio of Hard Phase A/B (*1) |
|---|---|---|---|---|---|---|---|---|---|---|
| | | Composition Ratio of Metal Atoms | | | | | Nonmetal Atomic Ratio | | | |
| | | Ti | Ta | W | Mo | Nb | N/C+N | Ni | Co | |
| Invention Sample 1 | AA | 85 | 7 | 8 | - | - | 0.42 | 10 | 10 | at least 20 |
| Comparative Sample | BB | 85 | 7 | 8 | - | - | 0.42 | 10 | 10 | 4.0 |
| Invention Sample 2 | CC | 85 | 7 | 8 | - | - | 0.42 | 10 | 10 | 2.5 |
| Invention Sample 2 | DD | 85 | 7 | 8 | - | - | 0.42 | 10 | 10 | 1.0 |
| Comparative Sample | EE | 85 | 7 | 8 | - | - | 0.42 | 10 | 10 | 0.2 |
| Comparative Sample | FF | 85 | 7 | 8 | - | - | 0.42 | 10 | 10 | not more than 0.05 |
| Comparative Sample | GG | 80 | 10 | 7 | - | 3 | 0.08 | 8 | 7 | 1.5 |
| Invention Sample 2 | HH | 80 | 6 | 5 | 2 | 7 | 0.36 | 9 | 5 | 1.5 |
| Comparative Sample | II | 83 | 4 | 5 | 2 | 6 | 0.75 | 10 | 6 | 1.5 |
| Comparative Sample | JJ | 73 | 8 | 9 | - | 10 | 0.38 | 3 | 1.5 | not more than 0.05 |
| Invention Sample 1 | KK | 81 | 7 | 4 | - | 8 | 0.41 | 12 | 10 | at least 20 |
| Invention Sample 2 | LL | 85 | 6 | 4 | - | 5 | 0.42 | 12 | 8 | 0.7 |
| Comparative Sample | MM | 82 | 4 | 1 | 3 | 10 | 0.32 | 20 | 20 | not more than 0.05 |

(*1) Grain Size "Abundance" $\frac{A}{B}$ Ratio of Hard Phase : (Volume Ratio). (Refer to Fig. 2)

(*2) Invention Sample 1: for Shank
Invention Sample 2: for Cutting Edge

UNITED STATES PATENT AND TRADEMARK OFFICE
CERTIFICATE OF CORRECTION

PATENT NO. : 5,186,739

DATED : February 16, 1993

INVENTOR(S) : Kazutaka Isobe, Toshio Nomura

It is certified that error appears in the above-indentified patent and that said Letters Patent is hereby corrected as shown below:

Column 10, Table 5 should read as follows:

Table 5

| No. | Test Name | Test Condition | |
|-----|-----------|------|-----------|
|     |           | Item | Condition |
| ① | Wear Resistance Evaluation Test (Continuous Drilling) | Workpiece<br>Cutting Speed<br><br>Feed Rate<br>Depth<br>Criterion | S50C ($H_B$ = 230)<br>60m/min., wet type<br>(water soluble cutting oil)<br>0.23mm/rev<br>25mm<br>status of cutting edge after working up to end of life |
| ② | Thermal Cracking Resistance Evaluation Test (Step Feed) | Workpiece<br>Cutting Speed<br><br>Feed Rate<br>Depth<br><br><br><br>Criterion | SCM425 ($H_B$ = 260)<br>50m/min., wet type<br>(water soluble cutting oil)<br>0.25mm/rev<br>drawn out every drilling by 5 mm and subjected to re-drilling. repeated 5 times, up to 25 mm<br>status of cutting edge after working 500 holes |

Signed and Sealed this

Eighth Day of March, 1994

Attest:

BRUCE LEHMAN

Attesting Officer

Commissioner of Patents and Trademarks